(12) United States Patent
Mitchell et al.

(10) Patent No.: US 10,208,894 B1
(45) Date of Patent: Feb. 19, 2019

(54) COMPACT DUAL DETECTOR DEWAR

(71) Applicants: Thomas A. Mitchell, Nazareth, PA (US); Jonas D. Corl, Bethelehem, PA (US); David M. Vincentsen, Bethlehem, PA (US)

(72) Inventors: Thomas A. Mitchell, Nazareth, PA (US); Jonas D. Corl, Bethelehem, PA (US); David M. Vincentsen, Bethlehem, PA (US)

(73) Assignee: WAVEFRONT RESEARCH, INC., Northampton, PA (US)

( * ) Notice: Subject to any disclaimer, the term of this patent is extended or adjusted under 35 U.S.C. 154(b) by 814 days.

(21) Appl. No.: 14/604,139

(22) Filed: Jan. 23, 2015

Related U.S. Application Data

(60) Provisional application No. 61/931,296, filed on Jan. 24, 2014.

(51) Int. Cl.
| F17C 3/08 | (2006.01) |
| F28F 13/00 | (2006.01) |
| F25B 9/00 | (2006.01) |

(52) U.S. Cl.
CPC .............. F17C 3/085 (2013.01); F28F 13/00 (2013.01)

(58) Field of Classification Search
CPC ...... F25B 9/00; F25B 9/06; F25B 9/10; F25B 2321/02; F17C 13/006; F17C 3/085; F17C 3/08; F25D 19/006; F25D 19/02; F25D 19/04; H01L 23/40; G01J 5/061; G01J 1/0252
See application file for complete search history.

(56) References Cited

U.S. PATENT DOCUMENTS

| 4,221,966 A * | 9/1980 | Kerr ........................ G01S 3/789 250/338.1 |
| 4,314,449 A * | 2/1982 | Reisman ................. F25B 21/02 62/3.2 |
| 4,833,898 A | 5/1989 | Chudy et al. |
| 4,918,929 A * | 4/1990 | Chudy .................... F17C 3/085 250/352 |
| 4,995,236 A | 2/1991 | Rouquier et al. |
| 2007/0291234 A1* | 12/2007 | Momose ................. F25B 21/02 353/52 |
| 2011/0204229 A1* | 8/2011 | Schamber ............. H01J 37/244 250/311 |
| 2011/0225982 A1* | 9/2011 | Zhou ........................ G06F 1/20 62/3.7 |
| 2014/0123684 A1* | 5/2014 | Toft ...................... G01J 1/0271 62/6 |

* cited by examiner

Primary Examiner — Frantz Jules
Assistant Examiner — Erik Mendoza-Wilkenfe
(74) Attorney, Agent, or Firm — Burns & Levinson LLP; Orlando Lopez

(57) ABSTRACT

A compact Dewar for imaging systems having multiple detector elements to support multiple imaging systems.

11 Claims, 6 Drawing Sheets

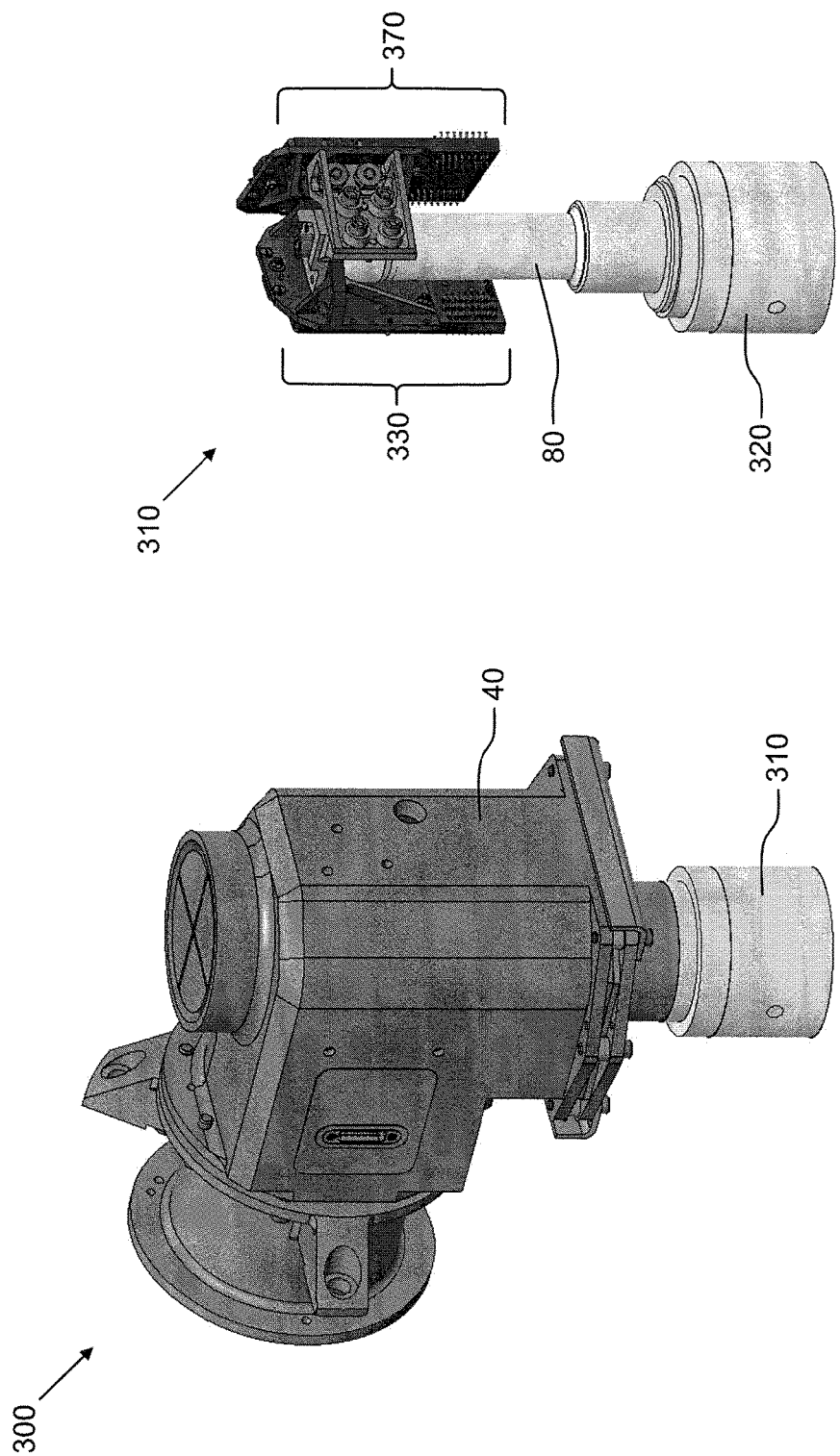

COMPACT DUAL DETECTOR DEWAR

CROSS REFERENCE TO RELATED APPLICATIONS

This application claims priority to and benefit of U.S. Provisional Application No. 61/931,296, entitled MULTIPLE COMPACT DUAL DETECTOR DEWAR SYSTEM, filed on Jan. 24, 2014, which is incorporated by reference herein in its entirety and for all purposes.

STATEMENT OF FEDERALLY SPONSORED RESEARCH OR DEVELOPMENT

This invention was made with U.S. Government support from the U.S. Army under contract W15P7T-06-D-R401, subcontract R401-SC-20316-0252. The U.S. Government has certain rights in the invention.

SUMMARY

The embodiments of the present teachings provide a compact Dewar for imaging systems having multiple detector elements to support multiple imaging systems.

For a better understanding of the present teachings, reference is made to the accompanying drawings and detailed description and its scope will be pointed out in the appended claims.

BRIEF DESCRIPTION OF THE DRAWINGS

FIG. 3A is an isometric view of a Dewar and cooler assembly from an embodiment of the present teachings;

FIG. 3B is an isometric view of a cold finger and multiple detector assembly from an embodiment of the present teachings;

DETAILED DESCRIPTION

These teachings relate generally to Dewars for imaging systems, and, more particularly, to a novel Dewar design that provides for multiple detectors.

In some optical systems, it is often desirable to have multiple imaging systems where more than one of the imaging systems requires a cryogenically cooled detector. Typically, each of these systems would require its own cryogenic cooler, which increases the size, weight, and power requirements for the combined sensor payload.

For example, consider some applications of multiple imaging sensor platforms in which it is desirable to have imaging sensors that operate in different spectral bands, but it is important to minimize the size, weight, and power of the payload. The compact dual detector Dewar of the disclosed teachings provides a single compact Dewar that supports multiple detectors and is consistent with meeting these requirements.

Figure 1:
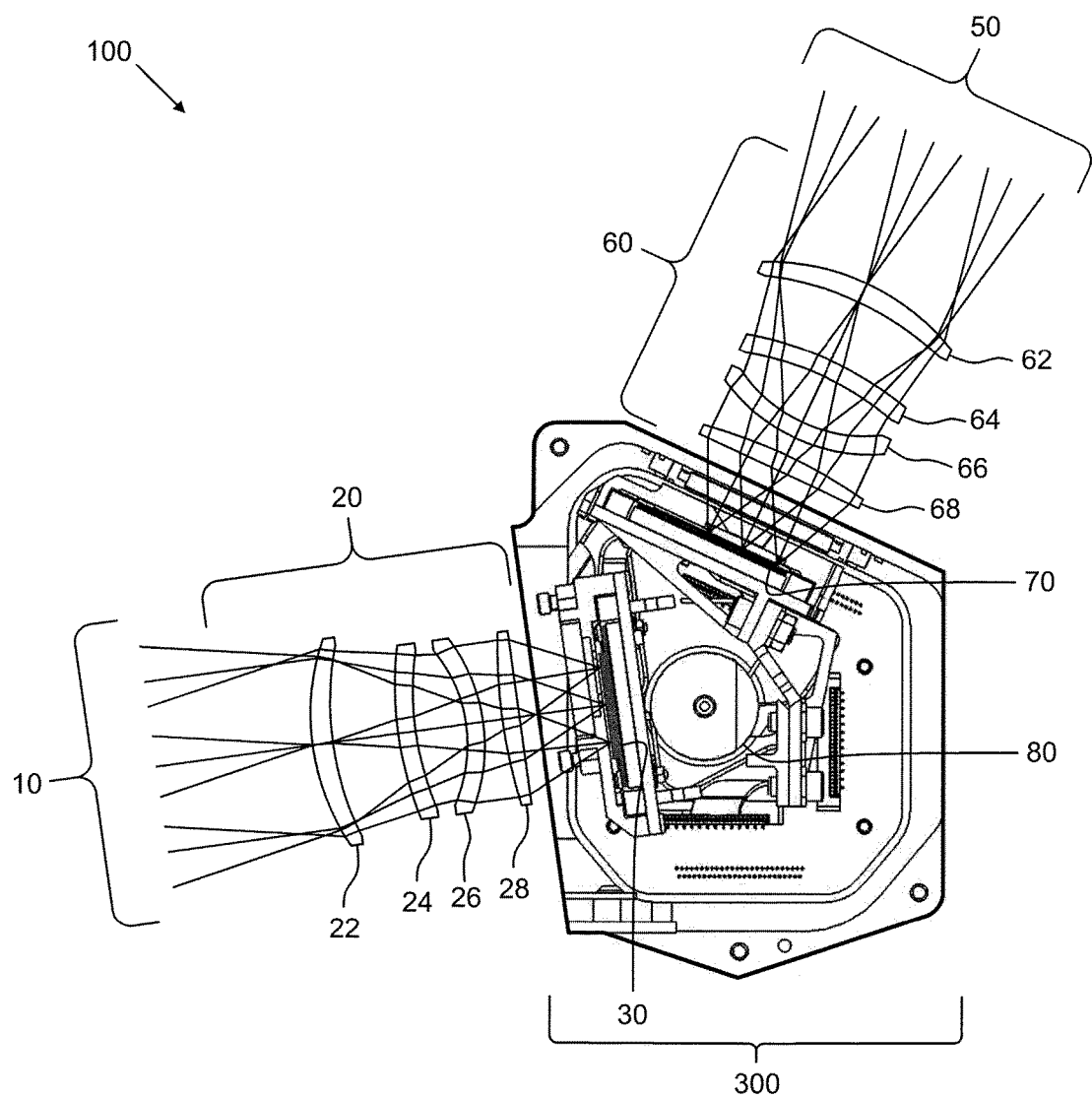
FIG. 1 is a schematic view of an embodiment of the present teachings, taken along its optical axis.

Reference is made to FIG. 1, which is a schematic view of an embodiment of the present teachings 100.

Electromagnetic radiation, typically in the ultraviolet, visible, and/or infrared bands, hereinafter referred to generally as light, (which can be used synonymously with electromagnetic radiation throughout), emitted or reflected by a given object, either real or virtual, hereinafter referred to generally as the source 10, located at an object plane (not shown) is incident on a first imaging optical system 20, which is comprised of either refractive or reflective elements or combination thereof, in this embodiment made up of refractive elements 22, 24, 26, and 28, and is capable of substantially receiving the light from the first source 10 and substantially imaging the light to a first detecting element 30 located within a Dewar and cooler assembly 300. Light from a second source 50, located at an object plane (not shown) is incident on a second imaging optical system 60, which is comprised of either refractive or reflective elements or combination thereof, in this embodiment made up of refractive elements 62, 64, 66, and 68, and is capable of substantially receiving the light from the second source 50 and substantially imaging the light to a second detecting element 70 located within the same Dewar and cooler assembly 300. The first detecting element 30 and second detecting element 70 are typically proximate to a common cooling source, such as but not limited to, a cold finger 80, located within the Dewar and cooler assembly 300.

Figure 2:
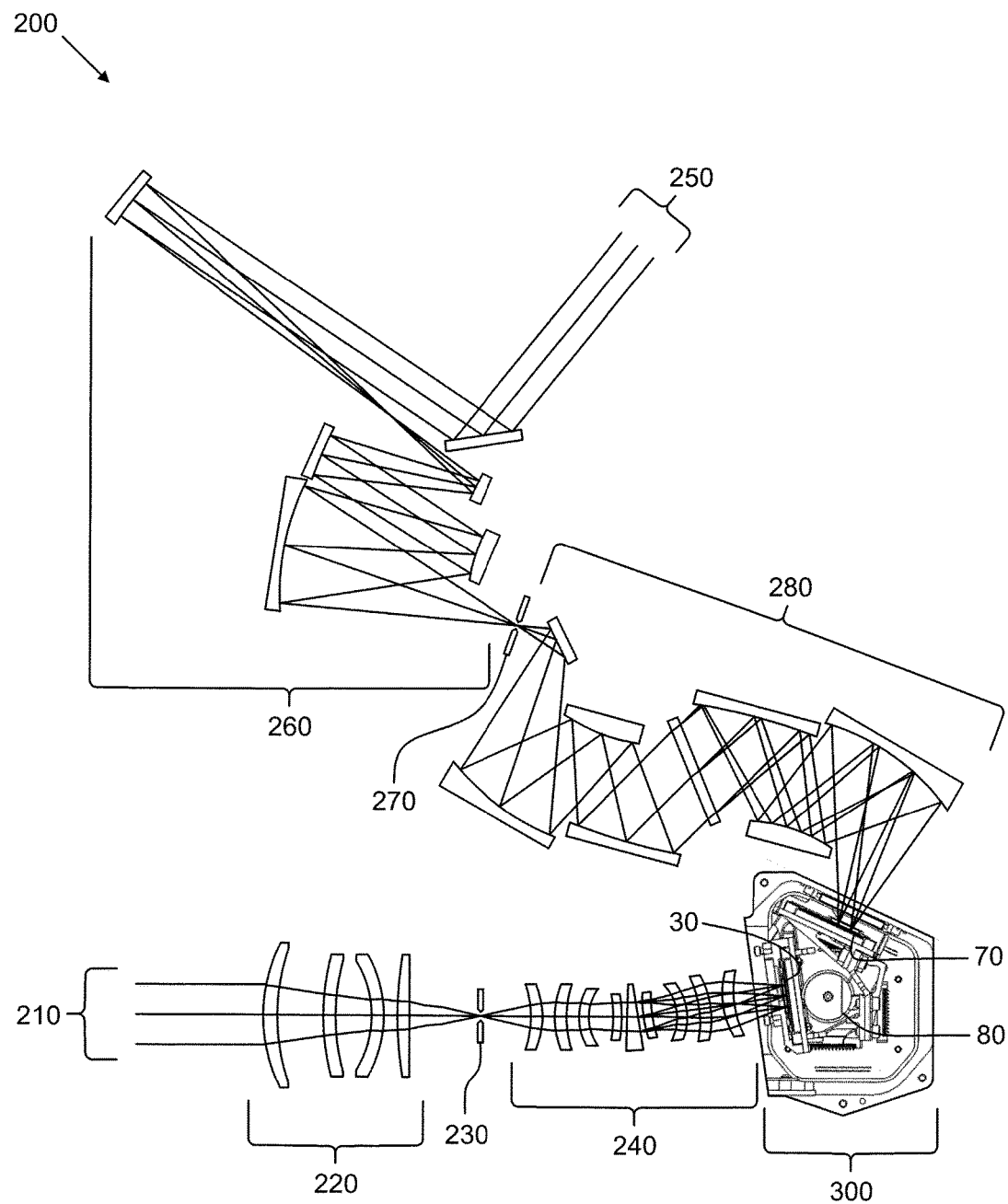
FIG. 2 is a schematic view of another embodiment of the present teachings, taken along its optical axis.

Reference is made to FIG. 2, which is a schematic view of an embodiment of the present teachings 200. Light from a first source 210, located at an object plane (not shown) is incident on a first imaging optical system 220, which is comprised of either refractive or reflective elements or combination thereof, and is capable of substantially receiving the light from the first source 210 and substantially imaging the light to a first focus 230. This light is then incident on a first relay optical system 240, in this embodiment, but not limited to, a spectrometer system, which is comprised of either refractive or reflective elements or combination thereof, and is capable of substantially receiving the light from the first imaging optical system 220 and substantially imaging the light to a first detecting element 30 located within a Dewar and cooler assembly 300. Light from a second source 250, located at an object plane (not shown) is incident on a second imaging optical system 260, which is comprised of either refractive or reflective elements or combination thereof, and is capable of substantially receiving the light from the second source 250 and substantially imaging the light to a second focus 270. This light is then incident on a second relay optical system 280, in this embodiment, but not limited to, a spectrometer system, which is comprised of either refractive or reflective elements or combination thereof, and is capable of substantially receiving the light from the second imaging optical system 260 and substantially imaging the light to a second detecting element 70 located within the same Dewar and cooler assembly 300. The first detecting element 30 and second detecting element 70 are typically proximate to a common cooling source, such as but not limited to, a cold finger 80, located within the Dewar and cooler assembly 300.

Reference is made to FIG. 3A, which is an isometric view of the Dewar and cooler assembly 300 of the embodiments of the present teachings illustrated in FIG. 1 and FIG. 2. In these embodiments, the Dewar and cooler assembly is made up of a Dewar housing 40 and a cryogenic cooler and detector assembly 310.

Reference is made to FIG. 3B, which is an isometric view of the cooler and detector assembly 310 of the Dewar and cooler assembly 300 illustrated in FIG. 3A, and in the embodiments of the present teachings illustrated in FIG. 1 and FIG. 2. In these embodiments, the cooler assembly is made up of the first detector assembly 330, second detector assembly 370, and a cryogenic cooler 320, such as but not limited to the expander component of a closed cycle cooler, and cold finger 80.

In some optical systems, it is often desirable to have the different operating temperatures for the different detecting elements. This can be achieved by using any number of thermal bridges, such as but not limited to thermal resistors, resistive mounts, or thermo-electric cooler stages, disposed between the common cooling source and the different detecting elements.

Figure 3C:
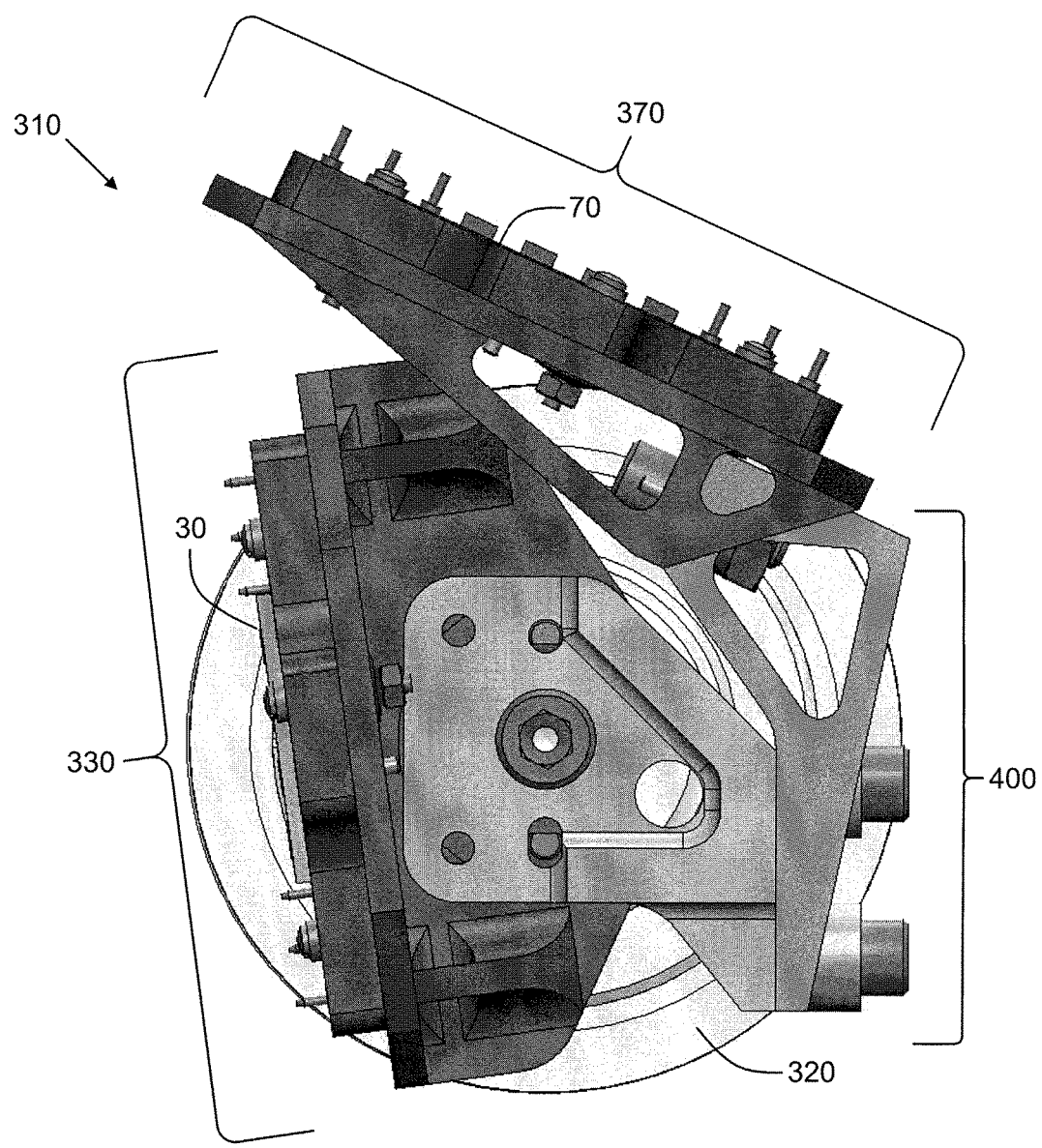
FIG. 3C is another view of a cold finger and multiple detector assembly from an embodiment of the present teachings.

Reference is made to FIG. 3C, which is another view of the cooler and detector assembly 310 of the Dewar and cooler assembly 300 illustrated in FIG. 3A and FIG. 3B, and in the embodiments of the present teachings illustrated in FIG. 1 and FIG. 2. In these embodiments, the cooler assembly is made up of the detector assemblies 330 and 370, and a cryogenic cooler 320, such as but not limited to the expander component of a closed cycle cooler. In this embodiment, the first detector assembly 330 connects the first detecting element 30 to the cryogenic cooler 320 and the second detector assembly 370 connects the second detecting element 370 to the cryogenic cooler 320 through the thermal bridge component 400.

Figures 4A, 4B:
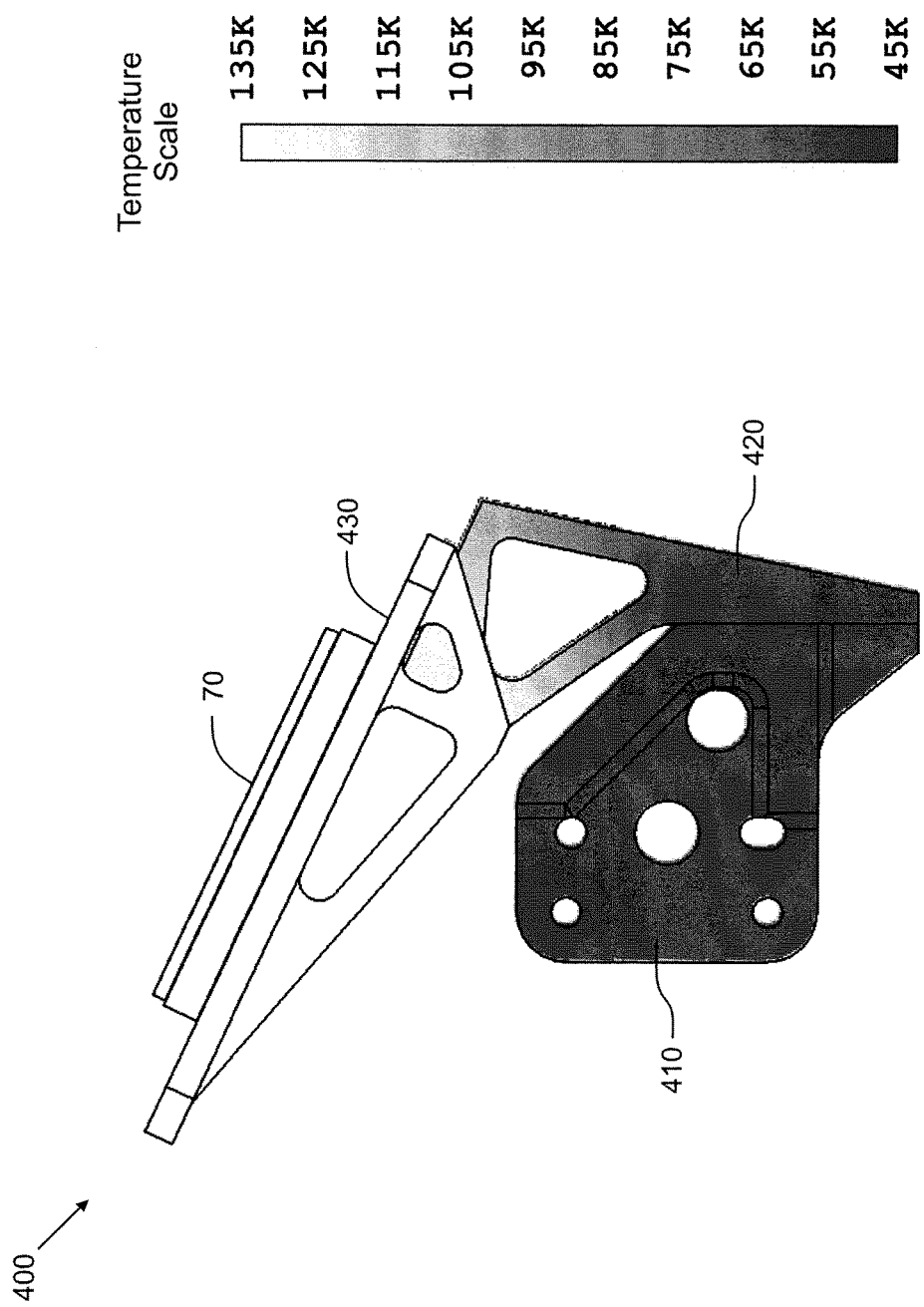
FIG. 4A is a view of a thermal bridge element from an embodiment of the present teachings with shading representing its temperature distribution.
FIG. 4B is a legend of the temperature distribution of a thermal bridge element from an embodiment of the present teachings.

Reference is made to FIG. 4A, which is a view of the thermal bridge assembly 400 of the cooler and detector assembly 310 illustrated in FIG. 3C, and in the embodiments of the present teachings illustrated in FIG. 1 and FIG. 2. The thermal bridge assembly 400, in this embodiment made up of, but not limited to, a cold finger mount structure 410, a thermal bridge structure 420, and a detector mounting structure 430, provides a substantially different operating temperature for the second detecting element 70 than that of the first detecting element 30. The design of the thermal bridge structure 420 uses the dissipative load characteristics of the second detecting element 70 and the thermal conductivity and geometry characteristics of the thermal bridge structure 420 to substantially provide an operating temperature at the second detecting element 70 that is different than that provided by the cold finger 80 of the cryogenic cooler assembly 320.

In this embodiment, the thermal bridge structure 420 is composed of a low thermal conductivity material, such as, but not limited to, zirconia, that has been designed such that the geometry provides a mounting structure with sufficient stiffness, strength, and dimensional stability to support the second detecting assembly 370 while providing a thermal conductivity sufficient to substantially maintain the second detector assembly 370 at a predetermined temperature for a given heat flux through the thermal bridge. Other embodiments may include the use of other materials, such as, but not limited to, plastics, ceramics, metals, and composites or cascades of these materials, such that the geometry and bulk conductivity are chosen to maintain the second detector assembly 370 at a desired temperature for a given heat flux through the thermal bridge. In still other embodiments the geometry of the thermal bridge may be of a solid structure, a truss structure, or any other type of structure suitable to support the second detecting assembly 370.

The cold finger mount structure 410 is mounted to the end of the cold finger 80 while the detecting element 70 is mounted to the detector mount structure 430. The cold finger mount structure 410 is mounted to a first location on the thermal bridge 420 while the detector mount structure 430 is mounted to a second location on the thermal bridge 420. The temperature of the detector mount structure 430 and the second detecting element 70 is determined by the thermal resistance of the thermal bridge, and allows for the mounted detecting element 70 to have a different operating temperature than the cold finger 80.

This has the distinct advantage of providing the capability to have two or more detectors, each with different operating temperatures, contained in a single Dewar environment and powered by a single cooler, thereby reducing the size, weight, and power of a system utilizing these teachings over conventional systems.

Reference is made to FIG. 4B, which is a legend of one possible temperature distribution of the thermal bridge assembly illustrated in FIG. 4A, and provides a shaded representation of the difference in the temperature of the cold finger mount structure 410 and the second detecting element 70.

Figure 5:
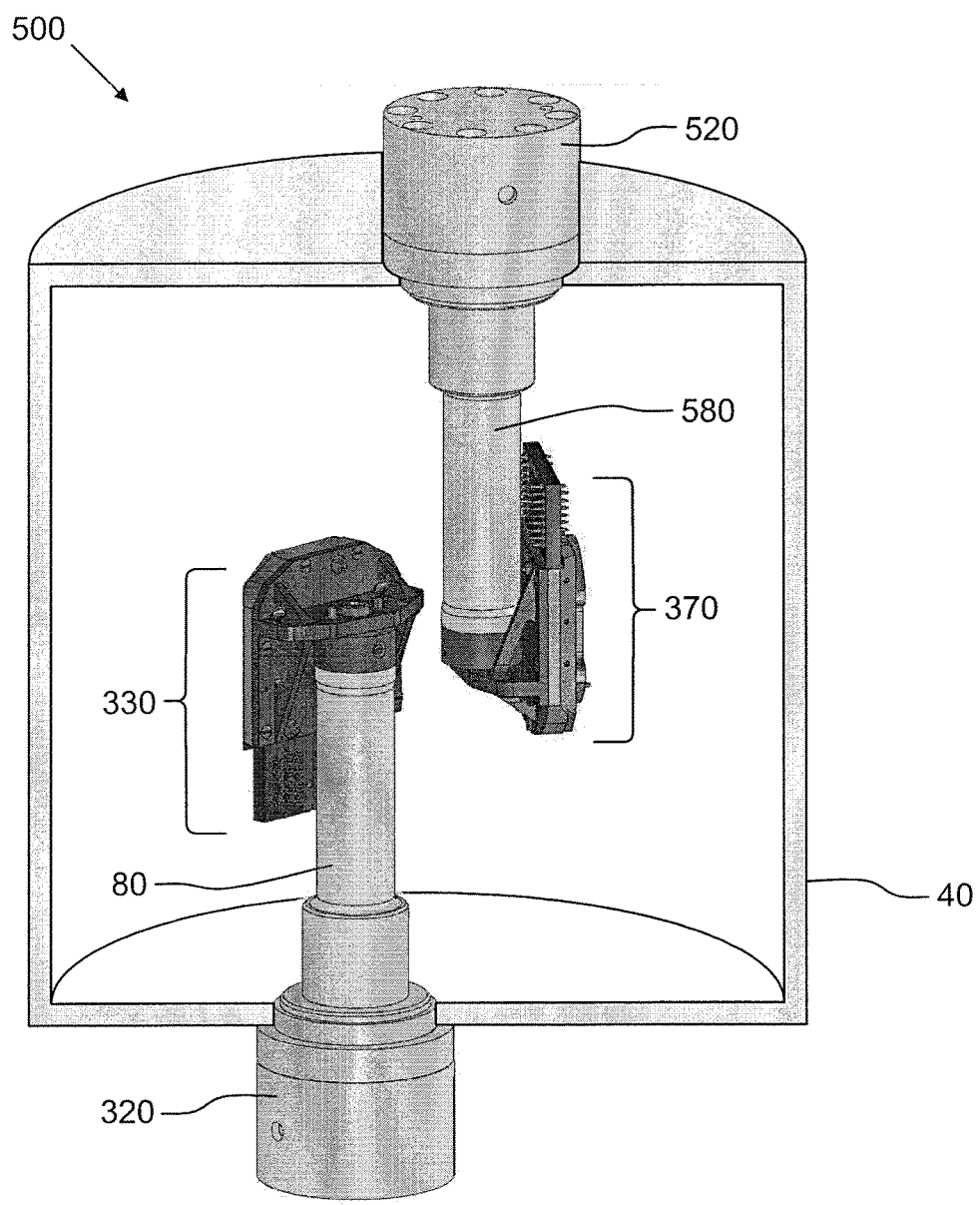
FIG. 5 is an isometric view of a Dewar and cooler assembly from a further embodiment of the present teachings.

Reference is made to FIG. 5 which is an isometric view of an embodiment of the present invention 500. In this embodiment, a first detector assembly 330 is mounted to a first cold finger 80 of a first cryogenic cooler 320, such as but not limited to the expander component of a closed cycle cooler, which is mounted within the evacuated envelope of a Dewar 40. Similarly, a second detector assembly 370 is mounted to a second cold finger 580 of a second cryogenic cooler 320, which is also mounted within the evacuated envelope of the same Dewar 40. The first and second cold fingers, 80 and 580, are operated by two separate cryogenic coolers 320 and 520, and can therefore be operated at substantially the same temperature or at two substantially different temperatures. This provides the capability for the first and second detector assemblies 330 and 370 to be operated at substantially the same temperature or at two substantially different operating temperatures.

Any number of optical elements, reflective or refractive, for any number of optical systems and any number of detecting elements operating at similar or different operating temperatures can be used in the embodiments of the present teachings.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

What is claimed is:

1. A dewar system comprising:
   an evacuated envelope;
   a coldfinger;
   the coldfinger being located within the evacuated envelope, wherein a portion of the coldfinger is maintained at a first cryogenic temperature;
   a first detector assembly;

the first detector assembly being mounted to the coldfinger and being substantially maintained at about the first cryogenic temperature;

a second detector assembly;

a thermal bridge assembly;

the second detector assembly being mounted to a first location on the thermal bridge assembly; the coldfinger being mounted to a second location on the thermal bridge assembly;

the thermal bridge assembly being configured to substantially provide a difference in temperature between the first location on the thermal bridge and the second location on the thermal bridge assembly;

the thermal bridge having a thermal resistance configured to provide a predetermined difference in temperature between the first detector assembly located on the coldfinger located on the second location on the thermal bridge assembly and the second detector assembly located on the first location on the thermal bridge assembly.

2. The dewar system of claim 1 wherein the thermal bridge assembly includes a thermal resistor.

3. The dewar system of claim 1 wherein the thermal bridge assembly includes a resistive mount.

4. The dewar system of claim 1 wherein the thermal bridge assembly includes a thermo-electric cooler.

5. The dewar system of claim 1 wherein the thermal bridge assembly produces a predetermined change in temperature between the coldfinger and the second detector assembly; the predetermined change in temperature being dependent on a heat load of the second detector assembly.

6. The dewar system of claim 1 wherein a detecting surface of the first detector assembly and a detecting surface of the second detector assembly are each mounted in a plane parallel to an axis of the coldfinger.

7. The dewar system of claim 1 wherein a normal to a detecting surface of the first detector assembly and a normal to a detecting surface of the second detector assembly are mounted in a common plane.

8. A dewar system comprising:

an evacuated envelope;

a first coldfinger;

the first coldfinger being located within the evacuated envelope, wherein a portion of the coldfinger is maintained at a first cryogenic temperature;

a first detector assembly;

the first detector assembly being mounted to the first coldfinger;

a second coldfinger;

the second coldfinger being located within the evacuated envelope, wherein a second portion of the second coldfinger is maintained at a second cryogenic temperature that is substantially different from the first cryogenic temperature;

a second detector assembly;

the second detector assembly being mounted to the second coldfinger.

9. The dewar system of claim 8 wherein a surface of the first detector assembly is mounted in a plane parallel to an axis of the first coldfinger and a surface of the second detector assembly is each mounted in a plane parallel to an axis of the second coldfinger.

10. The dewar system of claim 8 wherein a normal to a surface of the first detector assembly and a normal to a surface of the second detector assembly are mounted in a common plane.

11. The dewar system of claim 1 wherein the thermal bridge assembly comprises:

a mounting structure;

the mounting structure being composed of one or more components;

the mounting structure being configured to have the second detector assembly mounted on the mounting structure; the second detector assembly having a known heat load;

the mounting structure having known material thermal properties;

the mounting structure having a geometric shape designed to provide mounting support for the second detector assembly and to provide a predetermined thermal conductivity based on known material thermal properties of the mounting structure, geometry of the mounting structure, and a known heat load of the detector assembly;

the mounting structure configured to be mounted to the coldfinger.

* * * * *